United States Patent [19]

Isaacs

[11] 4,263,986
[45] Apr. 28, 1981

[54] MERCHANDISE STOCKING SYSTEM AND METHOD, AND EQUIPMENT USED THEREWITH

[76] Inventor: Harold Isaacs, 2567 Lafayette Dr., University Heights, Ohio 44118

[21] Appl. No.: 784,148

[22] Filed: Apr. 4, 1977

[51] Int. Cl.³ ............................................. E04H 3/04
[52] U.S. Cl. ..................................................... 186/62
[58] Field of Search .................. 186/1 R, 1 A, 1 AC, 186/1 L, 1 M, 1 N, 1 P, 1 Q, 1 W, 1 AA, 1 F; 280/33.99 H, 33.99 R; 211/22; 193/35 TE; 209/704

[56] References Cited

U.S. PATENT DOCUMENTS

| | | | |
|---|---|---|---|
| 1,444,359 | 2/1923 | Rand | 209/704 |
| 3,008,591 | 11/1961 | Cantelmo | 186/1 R X |
| 3,062,324 | 11/1962 | Hennion | 186/1 A |
| 3,075,616 | 1/1963 | Shoffner | 186/1 A |
| 3,276,558 | 10/1966 | Guske et al. | 193/35 TE |
| 3,489,247 | 1/1970 | Arneth | 186/1 |
| 3,881,574 | 5/1978 | Grange | 186/1 |
| 4,120,384 | 10/1978 | Choy | 280/33.99 C X |

Primary Examiner—Robert B. Reeves
Assistant Examiner—Gene A. Church
Attorney, Agent, or Firm—Edward E. Sachs

[57] ABSTRACT

Material handling system, particularly for a retail establishment having merchandise display and storage areas. The system provides equipment for handling, processing and transporting merchandise from storage to work stations and to display racks. The equipment includes a turntable attached to a flexible conveyor which abuts a conveyor table. Carts are positioned in a parking frame next to the table. Each cart is a wheeled cart having an upright end frame at one end therof, and shelves are hingedly connected to the end frame for movement between horizontal operative positions and substantially vertical storage positions. The carts are partially nestable with one another when the shelves are in their storage positions. An attachment device is releasably attachable to the cart end frame on the opposite side thereof from the shelves. The attachment device includes an adjustable shelf and a stool.

4 Claims, 17 Drawing Figures

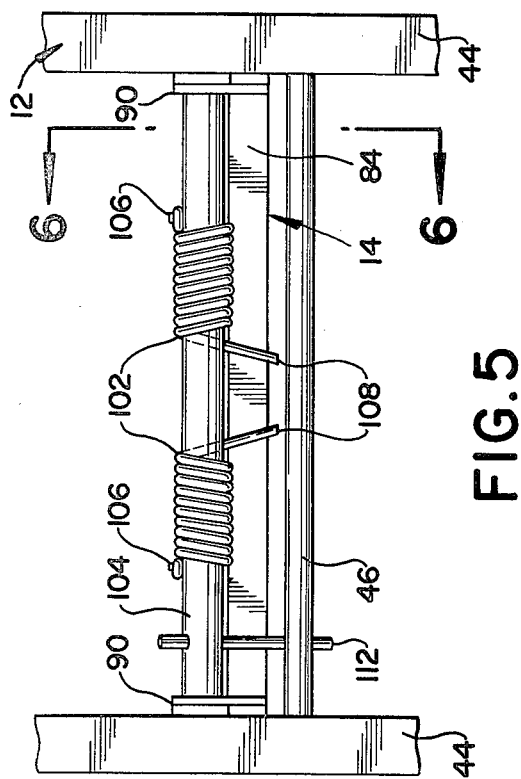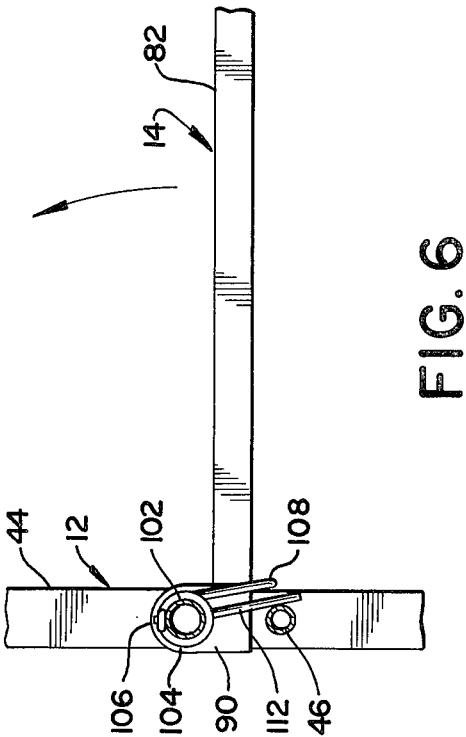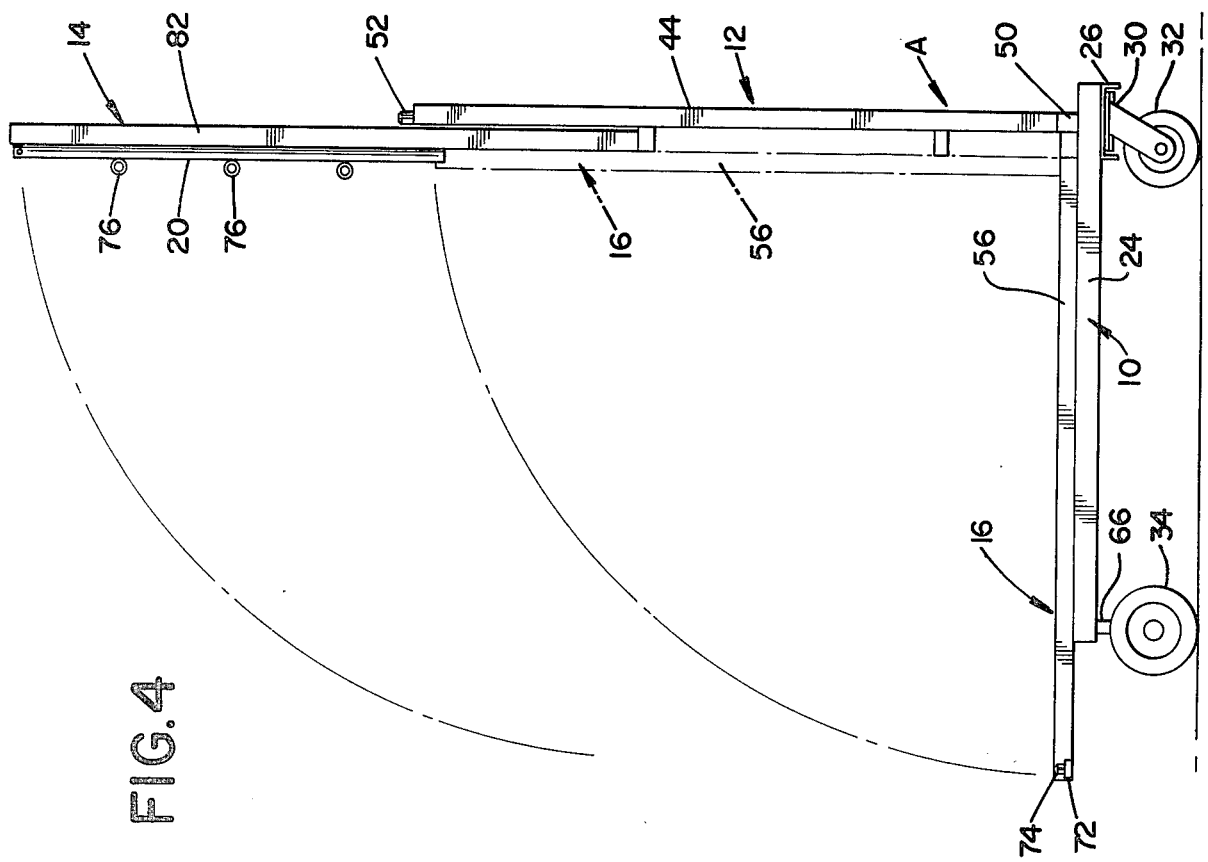

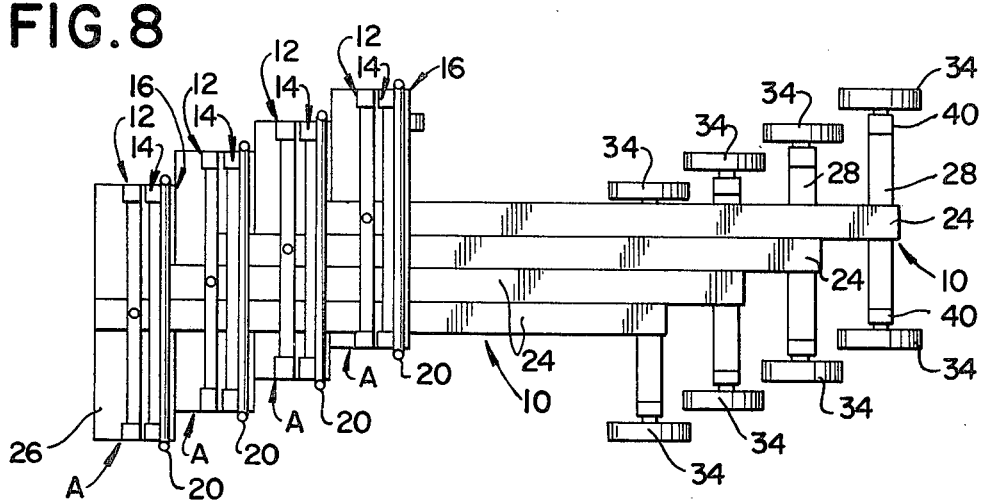
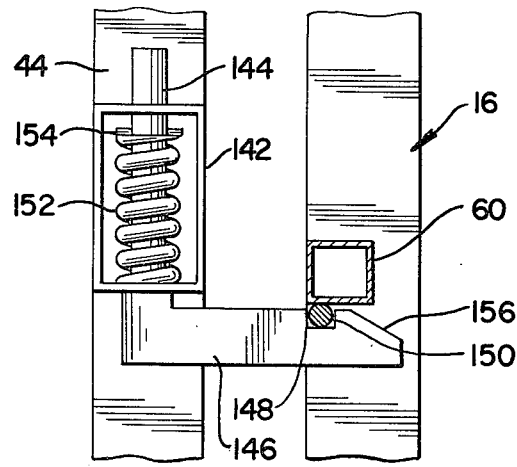

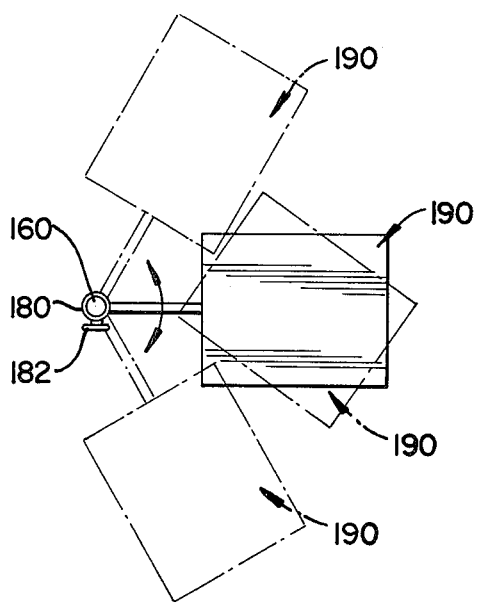
FIG. 12
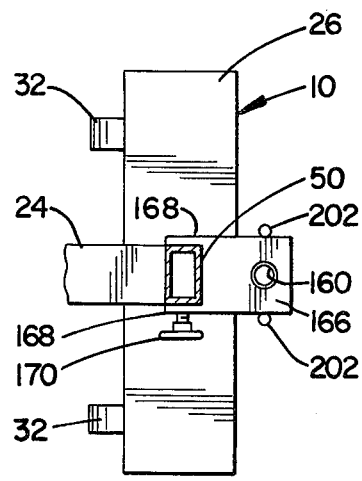
FIG. 13
FIG. 14
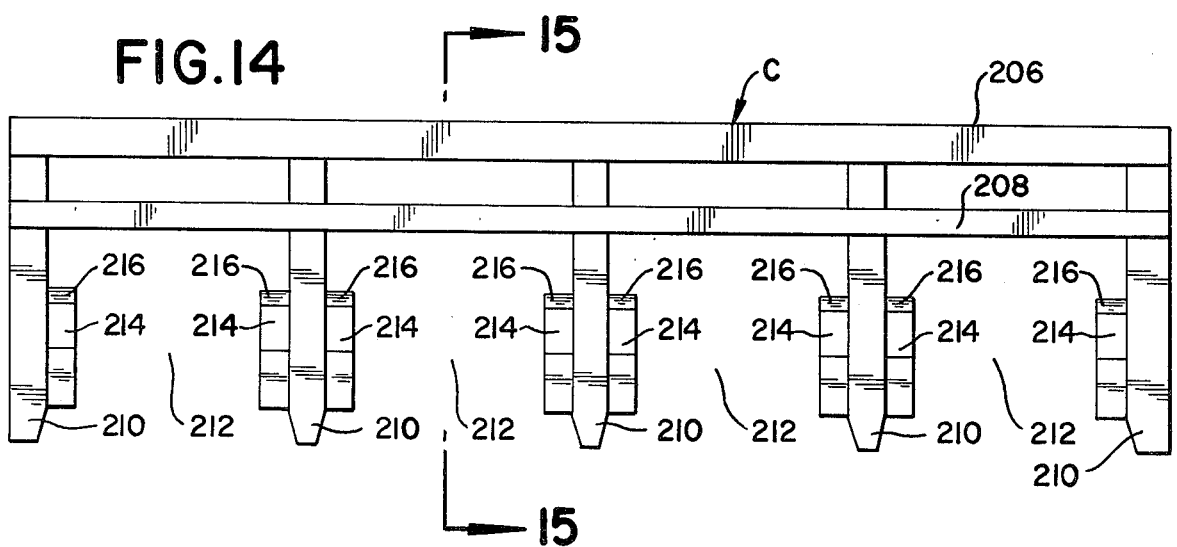
FIG. 15
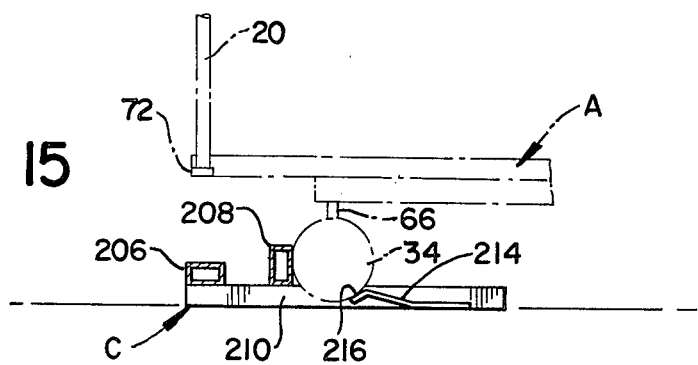

MERCHANDISE STOCKING SYSTEM AND METHOD, AND EQUIPMENT USED THEREWITH

The invention relates generally to distribution of merchandise and, more particularly, to stocking of merchandise on gondala shelves in retail establishments.

Packaged merchandise displayed in retail establishments such as supermarkets or the like is normally shipped and stored in cardboard boxes which must be slit open for removing the packaged merchandise. Stocking gondolas in retail establishments basically includes five steps as follows: slitting the boxes or cases open; price marking the packages; sorting the boxes; transporting the boxes to and along the proper aisle; and transferring the individual packages to the shelves. Stocking of the gondolas is not necessarily done in the particular order given.

Stocking of gondolas with packaged merchandise is presently carried out in a relatively disorganized and inefficient manner which requires a relatively large number of man hours.

It is therefore the primary object of the present invention to provide an improved merchandise stocking system and method, and equipment used therewith in order to improve the efficiency of stocking merchandise on display shelves.

It is a further object of the present invention to provide an improved wheeled cart for use in stocking merchandise.

It is another object of the invention to provide an improved attachment device for a wheeled cart to enable a person to easily reach the highest shelves of a merchandise display gondala and to support a box of merchandise packages for transfer to such gondola.

It is an additional object of the invention to provide an improved parking frame and work station in the merchandise storage area of a retail establishment for efficient slitting open of boxes, sorting of boxes and price marking the packages contained in the boxes.

It is also an object of the invention to provide an improved parking frame for positioning a plurality of wheeled carts in stable side-by-side relationship for being loaded with boxes at the work station in the merchandise storage area for transport to the merchandise display area.

An aspect of the invention resides in a wheeled cart having a base frame and an upright end frame extending upwardly from one end thereof. An upper shelf is hingedly connected to the end frame for movement between an operative position extending generally parallel to the base frame in upwardly spaced relationship thereto and a storage position extending upwardly from the hinged connection with the end frame. Support legs are carried by the upper shelf for supporting the upper shelf in its operative position on the lower shelf. These support legs form, at one end of the cart, between the upper and lower shelves, a shortened end frame which is optionally either open or provided with rungs.

The support legs are preferably collapsible to collapsed positions when the upper shelf is moved to its generally vertical storage position. In one arrangement, the support legs are hingedly connected with the upper shelf adjacent the outer end thereof for movement to collapsed positions extending substantially parallel to the upper shelf in its storage position.

The base frame, and preferably a lower hinged shelf, includes cooperating abutment means for cooperating with the support legs to prevent movement thereof to their collapsed position when the upper shelf is supported in its operative position. The abutment means may comprise projections upstanding from the lower shelf for reception in open free ends of the upper shelf support legs.

Releasable retaining means is provided for retaining the upper shelf in its substantially vertical storage position. In one arrangement, the releasable retaining means includes biasing means for normally biasing the upper shelf to its storage position. The upper shelf has a center of gravity located at a variable horizontal moment arm from its hinged connection with the end frame to exert a moment opposing the force of the biasing means. The moment and the force of the biasing means are equal when the shelf is in a balanced position intermediate the storage and operative positions thereof. The force of the biasing means is less than the moment when the shelf is toward its operative position from the balanced position, and is greater than the moment when the shelf is toward the storage position from its balanced position.

The cart preferably includes upper and lower shelves both hingedly connected to the end frame. The shelves have a length substantially greater than the distance between them in their operative positions. The shelves extend at least over a major portion of the length of the base frame and in one arrangement are substantially coextensive in length with the base frame. When both shelves are in their upward storage positions, a plurality of the carts are partially nestable within one another for compact storage. One end of the cart is completely unobstructed for easy end loading of first the lower shelf and then the upper shelf.

In one arrangement, releasable latch means is provided for releasably latching at least a lower shelf in its storage position.

The cart may include a stool carried by the end frame on the opposite side thereof from the base frame. The stool is spring biased upwardly so it is normally out of engagement with the floor, and automatically moves down into engagement with the floor under the weight of a person standing thereon. The stool thereby also acts as a brake for the cart when a person is standing on the stool.

The cart preferably includes an adjustable shelf located above the stool for supporting one case or box of packaged merchandise for easy transfer of the packages from the box onto the gondola shelves.

Both the stool and the adjustable shelf are swingable to positions on opposite sides of a longitudinal centerline of the cart for use on either side of an aisle.

The stool and adjustable shelf are preferably on an attachment device which is releasably attachable to the cart. This reduces the expense of the merchandise stocking system by having the attachment device only on those carts currently being used for transferring merchandise from the cart shelves onto the gondola shelves, while the carts being loaded with boxes of additional merchandise in the merchandise storage area are not equiped with the attachment device.

The attachment device is preferably a self-supporting unitary assembly when it is removed from a cart so that it can be stored in an upright position on the floor at any desirable location for convenient attachment to carts as required.

The carts are used in conjunction with a conveyor system and merchandise processing work station. The conveyor system includes a turntable attached to a flexible and expandable roll conveyor which abuts a conveyor table or work station. The carts are positioned in a parking frame located proximate to the work table. Typically, the parked carts and the work station will be located in the merchandise storage area of a retail establishment. The merchandise boxes or cases are conveyed to the work table on which they are supported for processing such as price marking, sorting, opening of boxes and the like. The boxes are then transferred to the proper cart for transport to the correct aisle of the merchandise display area when the cart is loaded with opened boxes.

The plurality of wheeled carts located adjacent the price marking and sorting work table are parked in side-by-side relationship in a parking frame which includes a main frame member having at least three elongated side frame members secured thereto in perpendicular relationship therewith. The side frame members are equidistantly spaced from one another to define a plurality of cart receiving spaces along the main frame member. The parking spaces have opposite sides defined by the sides of the side frame members and inner ends defined by the main frame member. The spaces have open outer ends opposite from their inner ends for rolling movement of the carts into the spaces. Ramps are located within the parking spaces along the sides thereof adjacent their inner ends. The ramps include upwardly sloping portions which slope inwardly in a direction from the outer ends of the parking spaces toward the inner ends thereof, and downwardly sloping portions which slope downwardly from the upwardly sloping portions toward the inner ends of the parking spaces. The downwardly sloping portions are spaced from the inner ends to define wheel receiving spaces which receive the wheels on the carts for retaining the carts in stable positions while being loaded with boxes.

For a better understanding of the present invention, together with other and further objects thereof, reference is had to the following description taken in connection with the accompanying drawings, and its scope will be pointed out in the appended claims.

In the drawings:

FIG. 4 is a side elevational view similar to FIG. 1 and showing shelves in storage positions;

FIG. 5 is a partial elevational view taken generally on line 5—5 of FIG. 1;

FIG. 6 is a partial cross-sectional elevational view taken generally on line 6—6 of FIG. 5;

FIG. 7 is a partial elevational view taken generally on line 7—7 of FIG. 3 and showing a lower shelf in its upright storage position;

FIG. 8 is a plan view showing a plurality of carts in partially nested position relative to one another;

FIG. 12 is a plan view showing swinging adjustment of a stool on the attachment device of FIG. 10;

FIG. 13 is a cross-sectional plan view taken generally on line 13—13 of FIG. 9;

FIG. 14 is a plan view of a parking frame used with the present invention;

FIG. 15 is a cross-sectional elevational view taken generally on line 15—15 of FIG. 14;

FIG. 17 is a fragmentary side view of the flexible conveyor.

Figure 1:
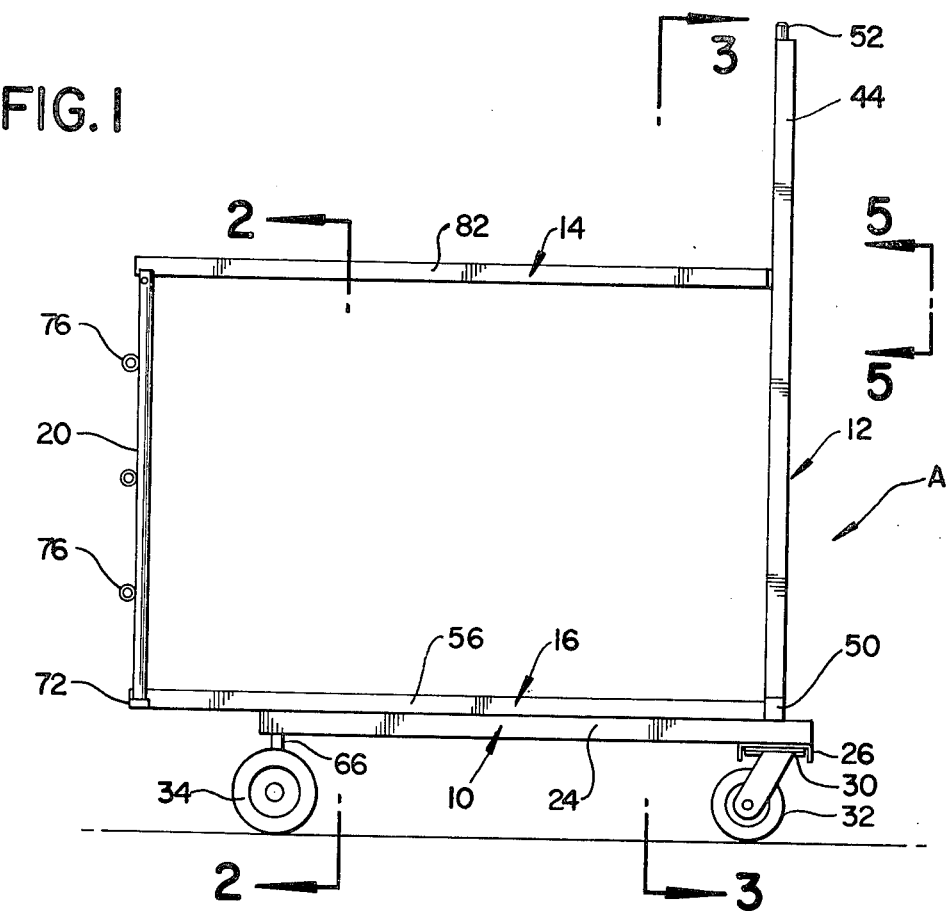
FIG. 1 is a side elevational view of a cart constructed in accordance with the present invention.

Referring now to the drawings, and particularly FIG. 1, there is shown a wheeled cart A including a base frame 10 having an upright end frame 12 extending upwardly from one end thereof. Upper and lower shelves 14 and 16 are hingedly connected at one end to the end frame 12. Collapsible support legs 20 are provided for supporting the upper shelf 14.

Figure 2:
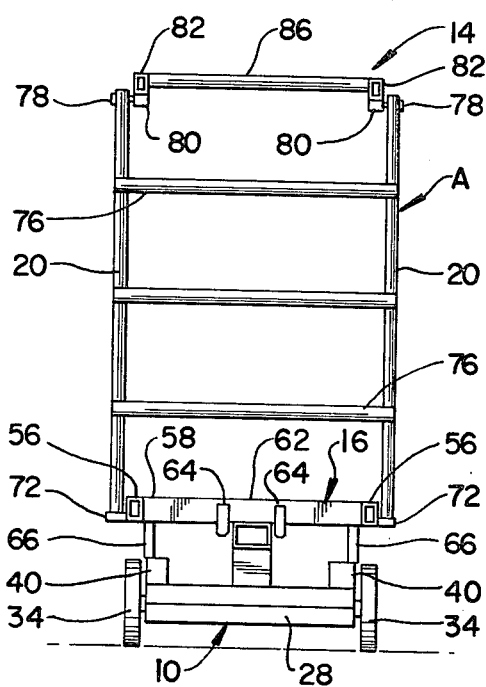
FIG. 2 is a cross-sectional elevational view taken generally on line 2—2 of FIG. 1.
Figure 3:
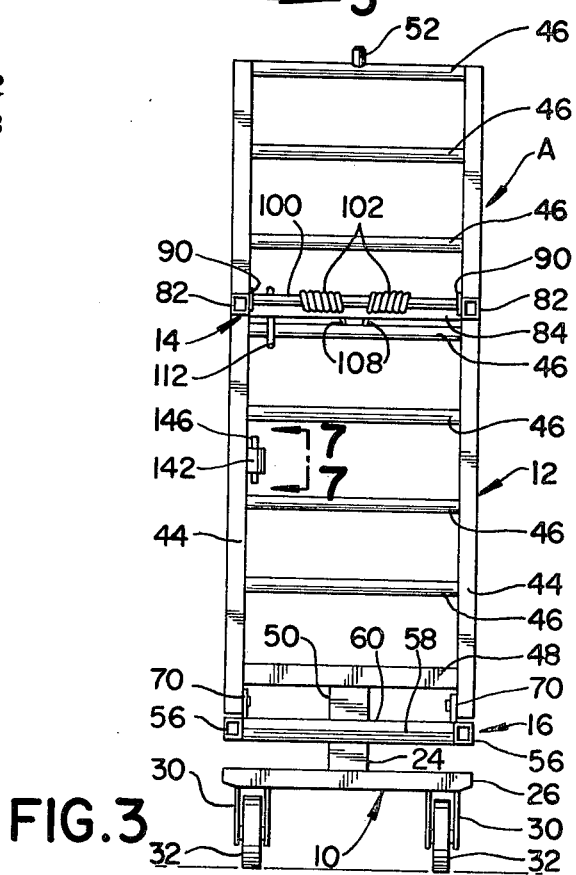
FIG. 3 is a cross-sectional elevational view taken generally on line 3—3 of FIG. 1.

The base frame 10 is substantially I-shaped in plan view and includes a central longitudinal frame member 24 having longitudinally spaced-apart transverse frame members 26 and 28 (see FIG. 2) secured to the underside thereof. The rear transverse frame member 26 has swivel supports 30 secured thereto for mounting rotatable wheels 32. The swivel supports 30 allow the wheels 32 to pivot about vertical axes for manipulation and steering of the cart A. The front transverse frame member 28 supports rotatable wheels 34. The rear transverse frame member 26 is spacedly secured to the undersurface of the longitudinal frame member 24, while the front transverse frame member 28 is spaced below the longitudinal frame member 24 by a spacer 38 which is secured to both of the frame members 24 and 28. Support blocks 40 are secured to the upper surface of the front frame member 28 adjacent the ends thereof and arranged slightly lower than the plane of the undersurface of the longitudinal frame member 24.

The upright end frame 12 may take many forms, and in one arrangement includes parallel opposite side members 44 which may be tubular and of rectangular cross-sectional shape. A plurality of parallel spaced-apart transverse rung members 46 are secured between the side members 44. The rung members 46 may be tubular and of cylindrical or rectangular cross-sectional shape. A lowermost rung 48 is rectangular and has a central vertical support 50 secured thereto and to the longitudinal base member 24 for supporting the end frame 12 in its vertical position on the longitudinal base member 24. The uppermost rung 46 has attaching means extending upwardly therefrom in the form of a centrally located generally cylindrical projection 52 for releasably attaching the upper end of an attachment device to the end frame 12. The lower shelf 16 may take many forms and is shown as including side members 56 and a rear member 58 all of tubular rectangular construction. A plurality of longitudinally spaced transverse rungs 60 are secured as by welding between the side members 56 and include at least one intermediate rung 62 in FIG. 2 of tubular rectangular construction. All of the transverse rungs 60 and 62 have their upper edges lying in the same plane as the top surfaces of the side members 56. Spaced guide projections 64 are welded to a rung member 62 and extend downwardly therefrom for closely receiving the longitudinal base member therebetween when the lower shelf 16 is in its horizontal operative position. The rung member 62 also has support projections 66 welded thereto and extending downwardly therefrom for engaging support blocks 40 to firmly support the forward end portion of the shelf 16 against twisting about its longitudinal axis and to minimize stresses on the hinged connections between the shelf 16 and the end frame 12. The rear member 58 of the lower shelf 16 has generally L-shaped brackets welded thereto and are pivotally received on suitable pins secured to the inside lower end portions of the side members 44 on the upright end frame 12. Connections of this type are shown more particularly by way of example in U.S. Pat. No. 3,782,746, issued Jan. 1, 1974, to Harold Isaacs.

The outside surfaces on the forward end portions of the side members 56 on the lower shelf 16 have projections 72 welded thereto in outwardly extending relationship and cylindrical pins 74 extend upwardly therefrom as shown in FIG. 4 to define cooperating abutment means receivable in the open bottom ends of the cylindrical tubular support legs 20 which are laterally braced by optionally one or more cross members 76, providing either a relatively solid end frame or a relatively free access area.

The upper ends of the support legs 20 are pivotally connected as at 78 to studs 80 welded to the underside of the forward end portions of side members 82 on the upper shelf 14. A rear transversely extending frame member 84 secured between the side members 82 is of tubular rectangular construction as are the side members 82. A plurality of longitudinally spaced transverse rungs 86 are welded between the side members 82 and have their upper edges lying in the same plane as the upper surfaces of the side members 82. The rear frame member 84 has generally L-shaped brackets welded thereto and suitable holes therethrough receive pins on the side members 44 of the end frame 12 to define hinged connections indicated generally by numerals 90 for hingedly connecting the upper shelf 14 to the end frame 12.

The upper and lower shelves 14 and 16 are movable between the generally horizontal operative positions shown in FIG. 1 and the upright storage positions shown in FIG. 4. In the operative positions of the shelves 14 and 16, the support legs 20 are upright for supporting the outer free end of the upper shelf 14 on the lower shelf 16 at locations spaced a substantial distance from the upright end frame 12. In view of the fact that the lower shelf 16 is also supported on the base frame 10, the support legs 20 are effectively supporting the upper shelf 14 on the base frame 10. When the upper shelf 14 is pivoted to its upright storage position wherein it extends substantially vertically upwardly from its hinged connection with the end frame 12, the support legs 20 swing about their pivot connections 78 with the upper shelf 14 to extend in substantially parallel relationship with the upper shelf 14 as shown in FIG. 4. The vertical portions of the L-shaped brackets connecting the rear end of the lower shelf 16 to the end frame 12 are longer than the corresponding brackets hingedly connecting the upper shelf 14 to the end frame 12 so the lower shelf 16 can swing upwardly to a position substantially parallel to the upper shelf 14 and outwardly thereof as shown in FIG. 4. The abutment means defined by the projecting pins 74 received in the open bottom ends of the support legs 20 firmly prevent collapse of the support legs by accidentally bumping same or the like.

Retaining means is provided for releasably retaining the upper shelf 14 in its upright storage position, and may include biasing means in the form of one or more torsion springs 102 positioned around a tube 104 rotatable about the same pins forming part of the hinged connections 90 for the upper shelf 14. One end of the springs 102 is connected with the tube 104 as at 106 and the other ends 108 extend downwardly into engagement with the rear frame member 84 of the upper shelf 14. The torsion springs 102 are wound to normally bias the ends 108 counterclockwise in FIG. 6 to exert a force normally biasing the upper shelf 14 upwardly to its storage position. A rod 112 extending through tube 104 bears against a rung member 46 on the end frame 12 to hold the shaft 104 against rotation and hold the springs 102 under stress so they exert a biasing force tending to bias the upper shelf 14 upwardly.

The upper shelf 14 has a center of gravity located at variable distances from the connections 90 as the upper shelf 14 moves between its horizontal operative position and its upright storage position. This variable horizontal distance defines a variable length moment arm for exerting a variable moment counteracting the biasing force of the springs 102. When the upper shelf 14 is approximately 20°-30° downward from its vertical storage position, the moment exerted by gravity is substantially balanced by the biasing force of the springs 102 so that the upper shelf 14 is in a balanced position. As the upper shelf 14 is moved toward its horizontal operative position from this balanced position, the moment due to gravity is greater than the moment exerted by the springs 102 so the shelf 14 will automatically fall to its horizontal operative position. When the shelf 14 is moved toward its upright storage position from its balanced position, the force exerted by the springs 102 is greater than the moment due to gravity so that the upper shelf 14 automatically moves to its upright storage position and is held therein under the biasing force of the springs 102. An elongated hook member can be used to grab onto a transverse rung member of the upper shelf 14 for starting to pull the shelf downwardly until it moves past its balanced position whereupon it will automatically fall to the position of FIG. 1. The support legs 20 also automatically swing from their collapsed position of FIG. 4 to their upright supporting position of FIG. 1. The legs can be grasped if desired for properly positioning them over the pins 74 on the lower shelf 16. Suitable stope can be provided on the upper shelf 14 for properly stopping swinging movement of the support legs 20 when they are upright for receiving the pins 74.

Releasable retaining means is provided for releasably retaining the lower shelf 16 in its upright storage position. The retaining means may take many forms and is shown in FIG. 7 as including a latch having a mounting member 142 with suitable holes therethrough reciprocatingly receiving a shaft 144 having an elongated latch projection 146 with a notch 148 receiving a rod 150 welded to a rung member 60 on the lower shelf 16. A coil spring 152 within the mounting member 142 has one end bearing against the mounting member 142 and its opposite end bearing against a roll pin 154 received in a suitable hole in the shaft 144. Pushing on the end of the shaft 144 will move the latch projection 146 downwardly in FIG. 7 for releasing the rod 150 from the notch 148. The forward end of the latch projection 146 is sloped as at 156 so it will automatically move downwardly when the latch rod 150 engages same as the lower shelf 16 is pivoted upwardly toward its storage position.

The upper and lower shelves 14 and 16 preferably extend from the upright end frame 12 over a major portion of the length of the base frame 10. In the most preferred arrangement, the upper and lower shelves 14 and 16 are substantially coextensive in length with the base frame 10.

As best shown in FIGS. 9-13, an attachment device B is releasably attachable to the cart A and includes an elongated upright support member in the form of a cylindrical post 160 having a laterally extending hook member 162 secured to its upper end and terminating in a downwardly open socket member 164 which snugly receives the projection 52 on the top end of the end frame 12. The lower end of the post 160 is secured to a connecting means in the form of a bifurcated mounting member 166 having spaced arms 168, see FIG. 13, between which an opening is defined for receiving the rear end of the central base member 24 on the base frame 10. An adjustable clamping device 170 may be in the form of a bolt threaded through a tapped hole in one of the arms 168 and having a manually graspable knob for tightening same firmly into engagement with the longitudinal base member 24 to releasably clamp the mounting means 166 thereto.

Figures 9, 10, 11:
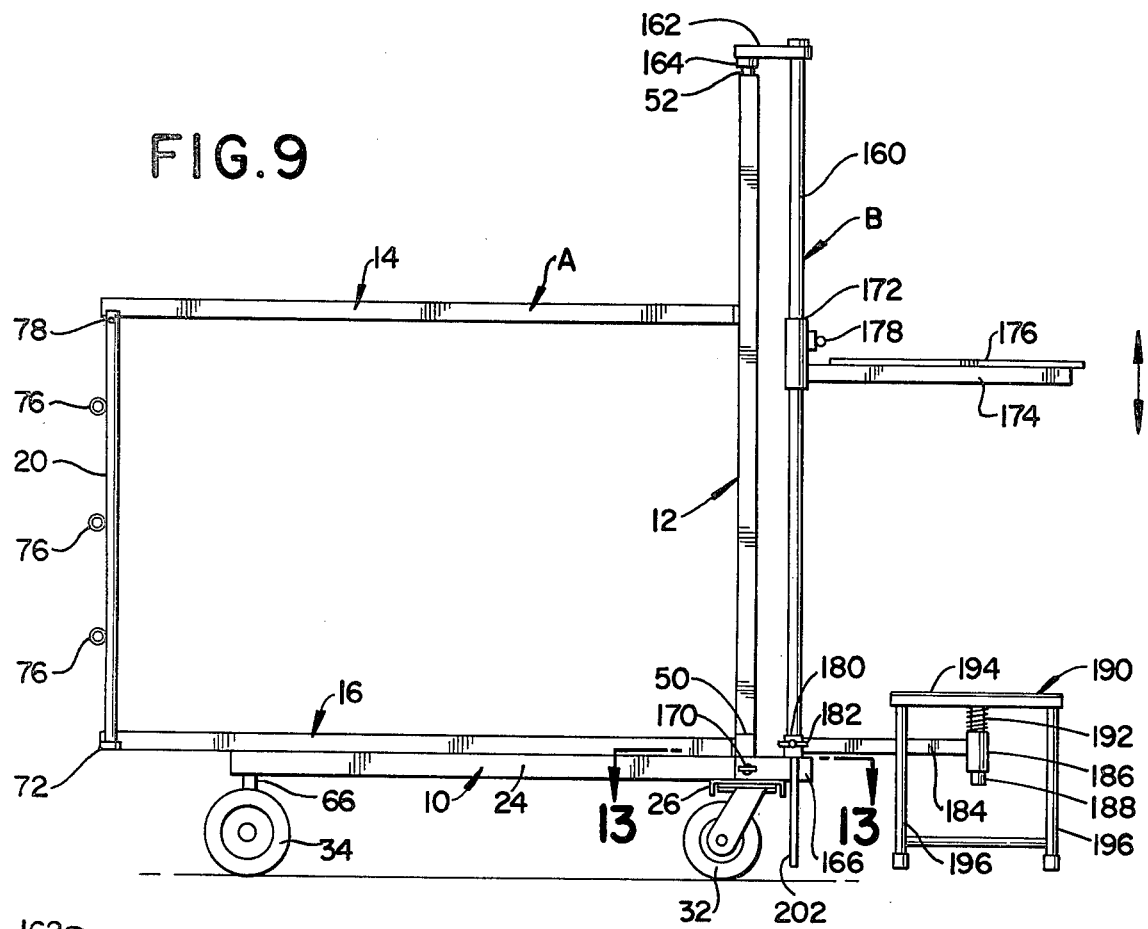
FIG. 9 is a side elevational view of the cart of FIG. 1 having an attachment device releasably mounted thereon.
FIG. 10 is a side elevational view of an attachment device having an adjustable shelf and stool.
FIG. 11 is a plan view of the attachment device showing swinging adjustment of the adjustable shelf.

A sleeve 172 is slidably and rotatably received on the post 160 and has a cantilevered support 174 welded thereto for supporting an adjustable shelf 176 which extends outwardly from the upright end frame 12 in a direction opposite from the shelves 14 and 16. A suitable tapped lateral hole in the sleeve 172 receives a threaded bolt having a handle on the outer end thereof to define a manually operable clamping device 178 which can be loosened or tightened for vertical adjustment of the shelf 176 between the shadow line positions shown in FIG. 10. Tightening of the clamping device 176 will lock the sleeve 172 in any desired adjusted vertical position on the post 160. As best shown in FIG. 11, the shelf 176 is also swingable for location on opposite sides of a longitudinal centerline of the cart A by selective tightening and loosening of the clamping device 178 to rotate the sleeve 172 relative to the post 160. In the arrangement shown in FIG. 11, the shelf 176 is angularly swingable through an arc of approximately 90°, with a 45° swing on each side of the longitudinal centerline of the cart A. Although the shelf 176 is shown as a flat support plate welded or otherwise secured to the cantilevered support 174, it will be appreciated that the shelf 176 can be in the form of a small rotatable turntable which will rotate relative to the cantilevered support 174.

Stool attaching means includes a sleeve 180 positioned on the post 160 adjacent the connecting means 166. A suitable stop is preferably provided to prevent vertical movement of the sleeve 180 on the post 160, while allowing rotation of the sleeve 180 relative to the post 160. A clamping device in the form of a bolt threaded through a tapped hole in the sleeve 180 includes a handle for selectively locking the stool attaching means in a desired rotated position and such clamping device is indicated generally by numeral 182. The stool attaching means includes a cantilevered support member 184 welded to the sleeve 180 and having another sleeve 186 at its other end receiving a central cylindrical projection 188 welded to the underside of stool 190. A coil spring 192 bears against the underside of stool step or seat portion 194 and the top of the sleeve 186 to normally bias the stool 190 upwardly so the bottom ends of the stool support legs 196 are out of engagement with the floor on which the wheels of the cart A are supported. That is, the spring 192 normally biases the legs 196 upwardly so that the bottom ends of those legs are above the plane in which the wheels 32 and 34 are normally supported. The free ends of the legs 196 may have rubber feet secured thereto. As shown in FIG. 12, operation of the clamping device 182 allows sleeve 180 to swing rotatably relative to the post 160 for placing the stool 190 in various positions on opposite sides of the longitudinal centerline of the cart A. The stool 190 may also have limited rotational movement about the sleeve 186 on the projection 188 if so desired. When a person stands on the stool 190, the weight causes the stool to move downwardly against the force of the spring 196 so that the bottom ends of the stool legs 196 engage the floor. This automatically serves as a brake for the cart A to prevent movement thereof while a person is standing on the stool 190. Even though the cart A may be equipped with a conventional foot operated brake, arranging the stool 190 to move downwardly into engagement with the floor for braking the cart A is an added safety feature for situations where a person forgets to apply the foot brake. The stool 190 and the adjustable shelf 176 may be swung rotatably to any staggered or vertically aligned positions relative to one another. When stocking shelves, a person takes boxes from the shelves on the cart A and places them on the adjustable shelf 176 which is adjusted to a desired level depending upon the gondola shelves to which the packaged merchandise will be transferred. For relatively high gondola shelves, the shelf 176 is adjusted upwardly so that a person standing on the stool 190 can conveniently reach the merchandise packaged in the box for transfer to the gondola shelves in the merchandise display area of the establishment.

Elongated vertical rods are welded to the bifurcated connecting means 166 to provide stabilizing support legs 202 having bottom ends lying in the same plane as the bottom ends of the stool legs 196. Therefore, when the attachment device B is removed from a cart A it can stand on the floor in a stable position by being supported on the stabilizing support legs 202 and the stool legs 196. A suitable stop or snap washer may be provided on the shaft 188 below the sleeve 186 for preventing upward movement and accidental pull out of the stool beyond a position wherein the bottom ends of the stool legs 196 lie in the same horizontal plane as the bottom ends of the stabilizing legs 202.

FIG. 14 is a plan view of a parking frame C for parking a plurality of wheeled carts A in side-by-side parallel relationship. The parking frame C includes elongated inner main frame members 206 and 208 having side frame members 210 secured thereto in any suitable manner as by welding. The side members 210 extend perpendicular to the frame members 206 and 208 in equidistantly spaced relationship to one another to define a plurality of side-by-side cart receiving spaces 212. Each cart receiving space 212 has opposite sides defined by the sides of the side frame members 210 and inner ends defined by the frame member 208. Ramps are located within each space 212 along the sides thereof adjacent their inner ends near the frame member 208. The ramps include downwardly sloping portions 216 which are at steeper slopes than the upwardly sloping portions 214, and slope downwardly from the upwardly sloping portions 214 toward the inner ends of the spaces 212 at the frame member 208. The downwardly sloping portions 216 are spaced from the frame member 208 a distance for locating a wheel 34 securely against movement whereby the wheel will be lifted slightly off the ground as shown in FIG. 15. The members on which the ramps 214 and 216 are formed may be welded to the side frame members 210. The outer ends of the side frame members 210 are tapered as shown in FIG. 15 so that a plurality of the carts A may be guided into the open spaces 212. The facing sides of the adjacent side frame members 210 are spaced-apart a distance only slightly greater than the distance between the outer surfaces of the wheels 34 on a cart. Th parking frame C may be hingedly bolted to the floor by hinges connected with the frame member 206 so that the parking frame C could be tilted upwardly to a generally vertical storage position when it is not being used. Typically the frame has eight spaces for eight carts, is twice as long as table 224, and is centered therebetween.

Figure 16:
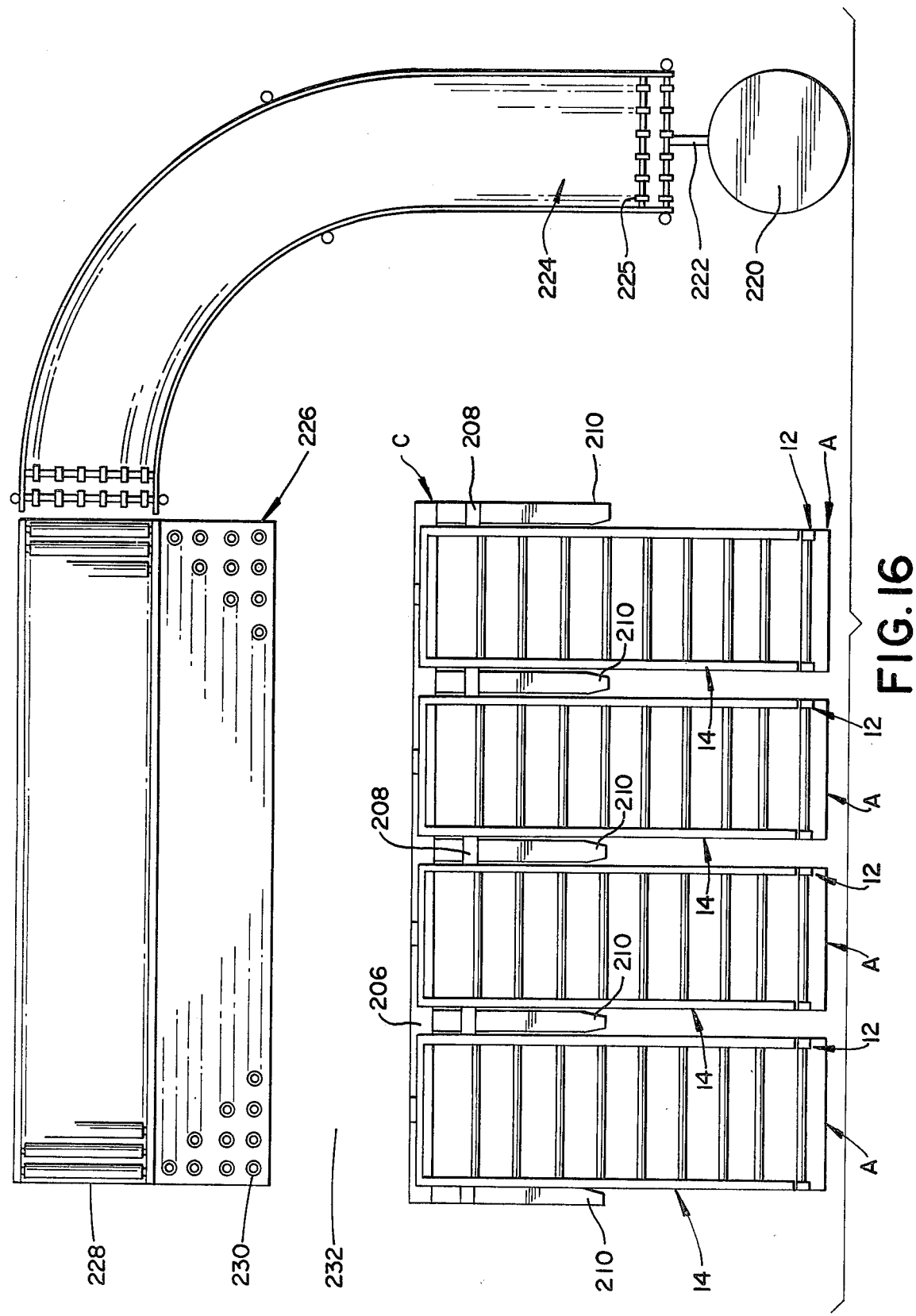
FIG. 16 is a plan view of a typical work station.

FIG. 16 shows a system which includes a rotatable turntable support 220 having suitable support legs for spacing same above a floor at a convenient level for manipulation of boxes thereon by a person. The underframe of the turntable 220 is connected by a frame member 222 with a conveyor 224. The conveyor 224 is of the expandable type, supported on rollers 225 and directionally flexible. The conveyor 224 can thus be rollably moved and extended and compressed or curved within limits. Preferably, the end of conveyor 224 adjacent to table 220 is free to move while the opposite end of the conveyor 224 is stationary and suitably connected with a sorting and price marking table 226 which may have elongated rollers 228 on a rear portion and ball rolls 230 on another portion. The table 226 is located at approximately waist height for easy manipulation of boxes thereon by persons standing in the aisle space 232. An overhead rack or the like may be provided above the table 226 for storing various price stamps and the like. The parking frame is located closely adjacent the table 226 across the aisle 232 therefrom and a plurality of the carts A are parked within the parking frame C. Each individual cart A parked in the frame C may be destined for a different aisle in the merchandise display area of the store. The equipment and system shown in FIG. 16 is located in the warehouse or merchandise storage area of the retail establishment. Boxes are suitably retrieved and carried to the turntable 220 where they are slit open and transferred to the conveyor 224 for movement to the table 226 where the packaged merchandise in each box is is price marked. One or more persons handling the boxes stand adjacent the table 226 visually inspect the boxes and packages therein to determine which of the plurality of carts the box is to be placed on. The person sorts the boxes by transferring each box to the appropriate cart A by placing same thereon and pushing same to the rear of the appropriate shelf. When the bottom shelves of the cart are fully loaded, an elongated hooked rod may be used by a person standing in the aisle 232 to pull the upper shelf downwardly toward its horizontal operative position. The upper shelves are then loaded the same as the lower shelves. Once a given cart is loaded, a pry bar is placed between the frame member 206 and the forward end of a cart as best visualized in FIG. 14 for prying the cart in a direction for displacing the wheels 34 thereof up the slopes 216. The attachment device B may then be attached to that cart for transport of same with the cart to the appropriate aisle in the display area of the retail establishment for transfer of the merchandise to the gondola shelves.

When a plurality of carts are not being used, they are at least partially nested as shown in FIG. 8 with the longitudinal or central base members 24 located in side-by-side relationship. The carts are longitudinally shifted relative to one another so the cross frame members 28 and 26 are spaced from one another on adjacent carts. Longitudinal spacing may be approximately equal to the thickness of the end frame 12, an upper shelf 14 and a lower shelf 16 when the shelves are in their upright storage positions. The longitudinal shifting may also be approximately the same as the width of the rear cross frame member 26.

In one arrangement, the shelves 14 and 16 have been made with a length of approximately four feet and the vertical spacing between them has been around three feet. It will be appreciated that various dimensions can be used depending on the use to which the carts will be put. The adjustable shelf and stool on the attachment device are adjustably swingable on opposite sides of the longitudinal centerline of a cart so the cart can be used conveniently on either side of an aisle and so a person standing on the stool can position the adjustable shelf in a convenient position. The spring 192 acting on the stool 190 defines a yieldable biasing means for normally biasing the stool upwardly out of engagement with the surface on which the cart is supported.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A merchandise stocking system for a retail establishment having a merchandise display and storage area comprising: a rotatable turntable for supporting slitable boxes containing packaged merchandise; a conveyor, at least in part expandable and directionally flexible, positioned adjacent to said turntable for receiving and moving said boxes; a price marking and sorting table located in operative relation to said conveyor; a plurality of four wheeled carts arranged in substantially parallel relation, alongside each other, adjacent to said price marking and sorting table for transporting said boxes to said merchandise display area; and mountable cart parking frame means extending adjacent said table for maintaining each cart temporarily in a fixed and predetermined position said frame means comprising an elongated frame member and a plurality of sets of side frame members extending perpendicular to the elongated frame member, each of said sets having two of said side frames spaced to correspond to the spacing between at least two of said four wheels of said cart, a ramp having upwardly and downwardly sloping portions arranged alongside at least one of said side frames of each set and being spaced from said elongated frame member to enable a cart wheel to be lodged into and temporarily blocked between the elongated member and the ramp and the abutting side frame.

2. The system according to claim 1, wherein said conveyor is rollably movable to assist in compression, extension and curving of the conveyor between the tables.

3. The system according to claim 2, wherein the end of the conveyor adjacent to the price marking and sorting table is stationary and the opposite end thereof is movable.

4. The system of claim 1 including an attachment releasably connectible to each said cart, said attachment including a stool and a box supporting shelf.

* * * * *